United States Patent
Liu et al.

(10) Patent No.: US 10,673,692 B2
(45) Date of Patent: Jun. 2, 2020

(54) METHOD, APPARATUS, AND SYSTEM FOR ACQUIRING CONFIGURATION FILE

(71) Applicant: Huawei Technologies Co., Ltd., Shenzhen (CN)

(72) Inventors: Geng Liu, Copenhagen (DK); Chenghu Shen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 399 days.

(21) Appl. No.: 15/239,203

(22) Filed: Aug. 17, 2016

(65) Prior Publication Data

US 2016/0359662 A1 Dec. 8, 2016

Related U.S. Application Data

(63) Continuation of application No. PCT/CN2014/072196, filed on Feb. 18, 2014.

(51) Int. Cl.
*H04L 12/24* (2006.01)
*H04N 21/426* (2011.01)
(Continued)

(52) U.S. Cl.
CPC ...... *H04L 41/0803* (2013.01); *H04L 12/2801* (2013.01); *H04L 61/2076* (2013.01);
(Continued)

(58) Field of Classification Search
CPC . H04L 41/08; H04L 41/0803; H04L 12/2801; H04L 61/2076; H04L 67/06;
(Continued)

(56) References Cited

U.S. PATENT DOCUMENTS 6,466,986 B1 * 10/2002 Sawyer ............... H04L 12/2801
709/245
6,598,057 B1 * 7/2003 Synnestvedt ........... H04L 29/06
(Continued)

FOREIGN PATENT DOCUMENTS

| CN | 101207607 A | 6/2008 |
|----|-------------|--------|
| CN | 102082684 A | 6/2011 |
| CN | 102577429 A | 7/2012 |
| CN | 103516535 A | 1/2014 |

OTHER PUBLICATIONS

Machine Translation and Abstract of Chinese Publication No. CN101207607, Jun. 25, 2008, 10 pages.
(Continued)

*Primary Examiner* — Jason D Recek
(74) *Attorney, Agent, or Firm* — Conley Rose, P.C.

(57) ABSTRACT

A method, an apparatus, and a system for acquiring a configuration file in a data over cable service are provided. The system includes: a convergence device, a cable modem terminal system CMTS assembly, and a cable modem CM, where the convergence device is connected to the CM using the CMTS assembly. The convergence device may be configured to intercept a first DHCP response message sent by a DHCP server to the CM; acquire configuration file information of the CM from the first DHCP response message; send the configuration file information of the CM to the CMTS assembly; replace address information of a Trivial File Transfer Protocol TFTP server in the first DHCP response message with address information of the convergence device, to form a second DHCP response message; and send the second DHCP response message to the CM.

13 Claims, 3 Drawing Sheets

(51) Int. Cl.

| | |
|---|---|
| *H04N 21/6547* | (2011.01) |
| *H04N 21/61* | (2011.01) |
| *H04L 12/28* | (2006.01) |
| *H04L 29/12* | (2006.01) |
| *H04L 29/08* | (2006.01) |

(52) U.S. Cl.
CPC .............. *H04L 67/06* (2013.01); *H04L 67/34* (2013.01); *H04N 21/42676* (2013.01); *H04N 21/6118* (2013.01); *H04N 21/6547* (2013.01)

(58) Field of Classification Search
CPC ......... H04N 21/42676; H04N 21/6118; H04N 21/6547
See application file for complete search history.

(56) References Cited

U.S. PATENT DOCUMENTS

| | | | | |
|---|---|---|---|---|
| 6,711,743 | B1* | 3/2004 | Hong | ............... H04N 5/76 348/E7.07 |
| 8,630,540 | B1* | 1/2014 | Arnold | ........... H04L 41/0803 398/58 |
| 2005/0005154 | A1 | 1/2005 | Danforth et al. | |
| 2006/0195611 | A1* | 8/2006 | Howe | ............... H04L 41/024 709/245 |
| 2011/0072119 | A1 | 3/2011 | Bronstein et al. | |
| 2011/0131624 | A1 | 6/2011 | Wu | |
| 2012/0257891 | A1* | 10/2012 | Boyd | ............... H04L 47/6215 398/45 |
| 2013/0070640 | A1* | 3/2013 | Chapman | ........... H04L 12/2801 370/254 |
| 2015/0295847 | A1* | 10/2015 | Shen | .............. H04L 47/72 370/230 |

OTHER PUBLICATIONS

Zeng, G., "Cable Modem technology and application," Voice and Screen World, Apr. 2004, 3 pages.
English Abstract of Zeng, G., "Cable Modem technology and application," Voice and Screen World, Apr. 2004, 1 page.
"Series J: Cable Networks and Transmission of Television, Sound Programme and Other Multimedia Signals, Interactive systems for digital television distribution, Third-generation transmission systems for interactive cable television services—IP cable modems: MAC and Upper layer protocols, vol. 1: Core Recommendation," ITU-T, J.222.2, Jul. 2007, 435 pages.
"Series J: Cable Networks and Transmission of Television, Sound Programme and Other Multimedia Signals, Interactive systems for digital television distribution, Third-generation transmission systems for interactive cable television services—IP cable modems: MAC and Upper Layer protocols, vol. 2: Annexes and appendices," ITU-T, J.222.2, Jul. 2007, 263 pages.
"Series J: Vable Networks and Transmission of Television, Sound Programme and Other Multimedia Signals, Interactive systems for digital television distribution, Third-generation transmission systems for interactive cable television services—IP cable modems: Physical layer specification," ITU-T, J.222.1, Jul. 2007, 184 pages.
"Series J: Cable Networks and Transmission of Television, Sound Programme and Other Multimedia Signals, Interactive systems for digital television distribution, Security services for third-generation transmission systems for Interactive cable television services—IP cable modems," ITU-T, J.222.3, Nov. 2007, 194 pages.
Fellows, D., et al., "DOCSIS Cable Modem Technology," Topics in Broadband Access, IEEE Communications Magazine, Mar. 2001, pp. 202-209.
Foreign Communication From a Counterpart Application, European Application No. 14883204.1, Extended European Search Report dated Dec. 9, 2016, 6 pages.
Foreign Communication From a Counterpart Application, PCT Application No. PCT/CN2014/072196, English Translation of International Search Report dated Nov. 19, 2014, 2 pages.
Foreign Communication From a Counterpart Application, PCT Application No. PCT/CN2014/072196, English Translation of Written Opinion dated Nov. 19, 2014, 12 pages.

* cited by examiner

METHOD, APPARATUS, AND SYSTEM FOR ACQUIRING CONFIGURATION FILE

CROSS-REFERENCE TO RELATED APPLICATIONS

This application is a continuation of International Application No. PCT/CN2014/072196, filed on Feb. 18, 2014, which is hereby incorporated by reference in its entirety.

TECHNICAL FIELD

Embodiments of the present disclosure relate to the field of communications technologies, and in particular, to a method, an apparatus, and a system for acquiring a configuration file.

BACKGROUND

With constant development of communications technologies, three traditional networks (a cable television network, a telecommunications network, and a computer network) gradually penetrate and integrate with each other. A hybrid fiber coaxial (HFC) emerges as the time requires. Constructing a broadband data platform on an HFC bidirectional network that has a frequency band of approximately 1 gigahertz (GHz) becomes an irresistible trend. A cable modem terminal system (CMTS) technology becomes a product of the trend.

Currently, a protocol standard to which the HFC makes a reference is the Data Over Cable Service Interface Specification (DOCSIS) and the C-DOCSIS standard. Network elements mainly included in the hybrid fiber coaxial HFC based on the DOCSIS standard are a server, for example, a Trivial File Transfer Protocol (TFTP) server or a Dynamic Host Configuration Protocol (DHCP) server; a CMTS; a cable modem (CM); and a terminal device connected to a CM device.

In the prior art, a process of acquiring a configuration file by a CM includes the CM sends a DHCP request message to a DHCP server, to request the DHCP server to allocate an IP address; a CMTS device acquires a DHCP response packet of the DHCP server, modifies an address of a TFTP server in the DHCP response packet into an address of the CMTS device, and sends the address of the CMTS device to the CM; the CM sends a request to the CMTS device to acquire a configuration file according to the address of the TFTP server in the DHCP response packet; and then the CMTS requests a configuration file of the CM from the TFTP server, and sends the configuration file acquired from the TFTP server to the CM. Because multiple CMs may be connected to a CMTS device, when each CM gets online, the CMTS device needs to start a TFTP client for the CM, to download a configuration file from a TFTP server. Starting the TFTP server to distribute a configuration file to the CM severely affects performance of the CMTS device, and further affects a service provisioning time of the CM.

SUMMARY

Embodiments of the present disclosure provide a method, an apparatus, and a system for acquiring a configuration file in a data over cable service, so as to reduce pressure of a CMTS device and improve performance of the CMTS device.

An embodiment of the present disclosure provides a DOCSIS system, including a convergence device, a CMTS assembly, and a CM, where the convergence device is connected to the CM using the CMTS assembly; the convergence device is configured to intercept a first DHCP response message sent by a DHCP server to the CM; acquire configuration file information of the CM from the first DHCP response message; send the configuration file information of the CM to the CMTS assembly; replace address information of a Trivial File Transfer Protocol TFTP server in the first DHCP response message with address information of the convergence device, to form a second DHCP response message; and send the second DHCP response message to the CM; the CM is configured to send, to the convergence device, a TFTP request message for requesting to deliver a configuration file; and the CMTS assembly is configured to intercept the TFTP request message, after it is determined that a configuration file name in the TFTP request message is the same as a configuration file name in the configuration file sent by the convergence device, request the TFTP server corresponding to the address information of the TFTP server to deliver a configuration file of the CM, and send the received configuration file to the CM.

The process of requesting, by the CMTS assembly, a TFTP server to deliver a configuration file of the CM may be requesting, by the CMTS assembly using address information of the CM as a source address, the TFTP server to deliver the configuration file of the CM.

The sending, by the CMTS assembly, the received configuration file to the CM may include sending, by the CMTS assembly, the received configuration file to the CM in a form of a TFTP response message, where the sent TFTP response message uses the address information of the convergence device as a source address.

In an embodiment of the foregoing system, the convergence device may be an optical line terminal (OLT) and the CMTS assembly may be a coaxial media converter (CMC).

In another embodiment of the foregoing system, the convergence device is a main control board in a CMTS device and the CMTS assembly is a service board in the CMTS device.

An embodiment of the present disclosure further provides a method for acquiring a configuration file in a data over cable service, where a DOCSIS system includes a convergence device, a CMTS assembly, and a CM, the convergence device is connected to the CM using the CMTS assembly, and the method includes acquiring, by the CMTS assembly, configuration file information of the CM from the convergence device, where the configuration file information of the CM is acquired by the convergence device from a first DHCP response message sent by a DHCP server to the CM; and intercepting, by the CMTS assembly, a TFTP request message that is sent by the CM to the convergence device and that requests to deliver a configuration file, after it is determined that a configuration file name in the TFTP request message is the same as a configuration file name in the configuration file sent by the convergence device, requesting, using address information of a TFTP server, which is delivered by the convergence device, the corresponding TFTP server to deliver the configuration file of the CM, and sending the received configuration file to the CM.

The CMTS assembly requests, using address information of the CM as a source address, the TFTP server to deliver the configuration file of the CM; and after receiving the configuration file, sends the configuration file to the CM in a form of a TFTP response message, where the sent TFTP response message uses address information of the convergence device as a source address.

An embodiment of the present disclosure provides a CMTS assembly, where the CMTS assembly is connected to a convergence device on a network side and is connected to a CM on a user side, and the CMTS assembly includes a first network side interface configured to acquire configuration file information of the CM from the convergence device; a first user side interface configured to intercept a TFTP request message that is sent by the CM to the convergence device and that requests to deliver a configuration file; a processing module configured to determine whether a configuration file name in the TFTP request message is the same as a configuration file name in the configuration file sent by the convergence device; a second network side interface configured to, after the processing module determines that the configuration file name in the TFTP request message is the same as the configuration file name in the configuration file sent by the convergence device, request, using the address information of a TFTP server, which is delivered by the convergence device, the corresponding TFTP server to deliver the configuration file of the CM; and a second user side interface configured to send the received configuration file to the CM.

The CMTS assembly is a CMC or a service board in a CMTS device.

An embodiment of the present disclosure provides a convergence device, where the convergence device is connected to a CMTS assembly and is connected to a CM using the CMTS assembly, and the convergence device includes a receiving module configured to receive a first DHCP response message sent by a DHCP server to the CM, and acquire configuration file information of the CM from the first DHCP response message; a sending module configured to send the configuration file information of the CM to the CMTS assembly, so that the CMTS assembly intercepts a TFTP request message from the CM; and a processing module configured to replace address information of a TFTP server in the first DHCP response message with address information of the convergence device, to form a second DHCP response message, and send the second DHCP response message to the CM using the sending module.

In an implementation manner, the convergence device is an OLT or a main control board in a CMTS device.

An embodiment of the present disclosure provides a CMTS assembly, wherein the CMTS assembly is connected to a convergence device on a network side and is connected to a CM on a user side, and the CMTS assembly comprises a first data transceiver, a second data transceiver, and a processor, wherein the processor is separately connected to the first data transceiver and the second data transceiver; the first data transceiver is connected to the convergence device configured to acquire configuration file information of the CM from the convergence device; the second data transceiver is configured to intercept a TFTP request message that is sent by the CM to the convergence device and that requests to deliver a configuration file; and the processor is configured to determine whether a configuration file name in the TFTP request message is the same as a configuration file name in the configuration file sent by the convergence device; after it is determined that the configuration file name in the TFTP request message is the same as the configuration file name in the configuration file sent by the convergence device, control the first data transceiver to request, using address information of a TFTP server, which is delivered by the convergence device, the corresponding TFTP server to deliver the configuration file of the CM; and control the second data transceiver to send the received configuration file to the CM.

The CMTS assembly is a CMC or a service board in a CMTS device.

An embodiment of the present disclosure provides a convergence device, wherein the convergence device is connected to a CMTS assembly, the convergence device is connected to a CM using the CMTS assembly, and the convergence device comprises a data receiver configured to receive a first DHCP response message sent by a DHCP server to the CM, and acquire configuration file information of the CM from the first DHCP response message; a data transmitter configured to send configuration file information of the CM to the CMTS assembly; and a processor configured to replace address information of a TFTP server in the first DHCP response message with address information of the convergence device, to form a second DHCP response message, and send the second DHCP response message to the CM using the data transmitter.

The convergence device is an OLT or a main control board in a CMTS device.

The embodiments of the present disclosure provide the method, the apparatus, and the system for acquiring a configuration file in a data over cable service. The data over cable service system includes a convergence device, a cable modem terminal system CMTS assembly, and a cable modem CM, where the convergence device is connected to the CM using the CMTS assembly, and the CMTS assembly can implement TFTP distributed processing without deploying an IP address, thereby reducing pressure of a CMTS and improving performance of the CMTS.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
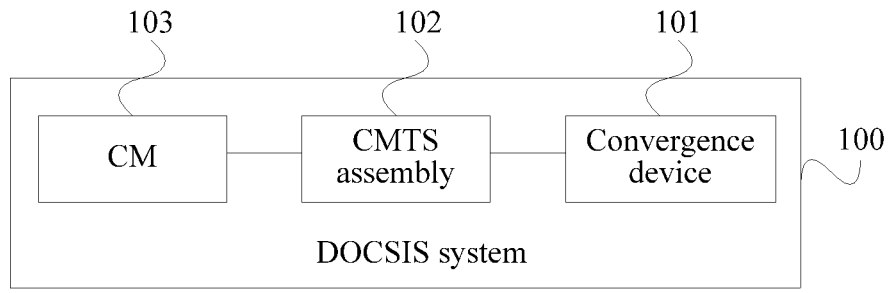
FIG. 1 is a schematic structural diagram of a data over cable service system according to an embodiment of the present disclosure.

FIG. 1 is a schematic structural diagram of a data over cable service system according to an embodiment of the present disclosure. The system is a DOCSIS system. The DOCSIS system 100 includes a convergence device 101, a CMTS assembly 102, and a CM 103, where the convergence device 101 is connected to the CM 103 using the CMTS assembly 102.

In a scenario, the convergence device 101 may be an OLT, the CMTS assembly 102 may be a CMC, the OLT may be connected to the CMC using a passive optical network (PON) or a Gigabit Ethernet (GE), and a function of a CMTS is implemented by a combination of the OLT and the CMC. The OLT may interact with the CMC using a Layer 2 message.

The convergence device 101 and the CMTS assembly 102 may be a main control board and a service board in a CMTS device respectively, where the convergence device 101 is the main control board and the CMTS assembly 102 is the service board.

The convergence device 101 is configured to intercept a first DHCP response message sent by a DHCP server to the CM 103; acquire configuration file information of the CM 103 from the first DHCP response message; send the configuration file information of the CM 103 to the CMTS assembly 102; replace address information of a TFTP server in the first DHCP response message with address information of the convergence device 101, to form a second DHCP response message; and send the second DHCP response message to the CM 103.

When a user applies a terminal device connected to the CM 103 in a network, the terminal device triggers the CM 103 to dial up to get online, the CM 103 requests an Internet protocol (IP) address from the DHCP server, and the convergence device 101 may be used as a relay node of the DHCP server, to forward a DHCP request message of the CM 103 to the DHCP server.

The convergence device 101 intercepts the first DHCP response message sent by the DHCP server to the CM 103, and acquires configuration file information of the CM 103 from the first DHCP response message, where the configuration file information carries an IP address and a port number of the TFTP server storing a configuration file and an IP address and a media access control (MAC) address of the CM 103, a configuration file name, and the like. For example, the port number of the TFTP server may be 69.

After acquiring the configuration file information of the CM 103, the convergence device 101 sends the configuration file information of the CM 103 to the CMTS assembly 102, and the CMTS assembly 102 saves the received configuration file information.

The convergence device 101 further needs to replace the address information of the TFTP server in the first DHCP response message with the address information of the convergence device 101, to form the second DHCP response message, for example, replaces the IP address of the TFTP server in the first response message with an IP address of the convergence device 101, and sends the second DHCP response message to the CM 103. The convergence device 101 changes the IP address of the TFTP server to the IP address of convergence device 101. Therefore, the convergence device 101 hides the IP address of the TFTP server from the CM 103, so that a hacker is prevented from learning the IP address of the TFTP server, thereby preventing the hacker from attacking the TFTP server.

After receiving the second response message of the convergence device 101, the CM 103 may send, to the convergence device 101, a TFTP request message for requesting to deliver a configuration file. The CMTS assembly 102 is configured to intercept the TFTP request message, after it is determined that a configuration file name in the TFTP request message is the same as a configuration file name in the configuration file sent by the convergence device 101, request the TFTP server corresponding to the address information of the TFTP server to deliver a configuration file of the CM 103, and send the received configuration file to the CM 103.

The TFTP request message sent by the CM 103 includes the configuration file name, and the first DHCP response message sent by the convergence device 101 includes the configuration file name allocated to the CM 103. After determining that the configuration file name in the TFTP request message is the same as the configuration file name in the configuration file sent by the convergence device 103, the CMTS assembly 102 requests the TFTP server to deliver the configuration file of the CM.

When the CMTS assembly 102 requests the TFTP server to deliver the configuration file of the CM, the CMTS assembly may request, using address information of the CM 103 as a source address, the TFTP server to deliver the configuration file of the CM 103. After receiving the configuration file delivered by the TFTP server, the CMTS assembly 102 may send the received configuration file to the CM 103 in a form of a TFTP response message, where the sent TFTP response message uses the address information of the convergence device 101 as a source address.

The CMTS assembly 102 sets an uplink capture rule according to the configuration file information, where the uplink capture rule refers to a capture rule from a user side to a network side. The uplink capture rule may include that the CMTS assembly 102 captures a packet whose destination address is the IP address of the convergence device 101 and whose destination port number is the port number 69 of the TFTP server. The CMTS assembly 102 may capture, according to the set uplink capture rule, the TFTP request message that is sent by the CM 103 and that requests to deliver the configuration file, and the TFTP request message is a User Datagram Protocol (UDP) packet. The CMTS assembly 102 starts the TFTP server. After capturing the TFTP request message sent by the CM 103, the CMTS assembly 102 requests, using the IP address and a port number of the CM 103 as the source address, the network side to deliver the configuration file of the CM 103. In addition, the CMTS assembly 102 sets a downlink capture rule according to the determined IP address and port number of the CM 103, where the downlink capture rule is capturing a data packet whose destination address is the IP address of the CM and whose destination port number is the port number of the CM. The CMTS assembly 102 may capture the TFTP response message according to the set downlink capture rule. The CMTS assembly 102 sends the received configuration file to the CM 103 in a form of the TFTP response message, where the sent TFTP response message uses the IP address of the convergence device 101 and a port number of the CMTS assembly 102 as the source address.

In conclusion, in this embodiment, when the convergence device 101 is an OLT, the CMTS assembly 102 is a CMC. At uplink, the CMC sends a request packet to the TFTP server using the IP address of the CM 103, and captures a downlink packet of the TFTP server, to implement Layer 3 communication with the TFTP server. At downlink, the CMC sends a data packet to the CM 103 using the IP address of the OLT, and captures an uplink packet of the CM 103, to implement Layer 3 communication with the CM 103. In this way, the CMC can implement TFTP distributed processing for the accessed CM 103 in a case in which an IP address is not deployed. Correspondingly, the TFTP distributed processing changes from single centralized processing of the OLT into distributed processing of the CMC, thereby greatly improving efficiency of the TFTP distributed processing, reducing working pressure of the OLT, and improving performance of the OLT.

Optionally, the convergence device 101 may be a main control board in the CMTS device, and the CMTS assembly 102 is a service board on the CMTS device. At uplink, the service board sends a packet to the TFTP server using the IP address of the CM 103, and captures a downlink packet of the TFTP server, to implement Layer 3 communication with the TFTP server. At downlink, the service board sends a packet to the CM using the IP address of the main control board, and captures the uplink packet of the CM 103, to implement Layer 3 communication with the CM 103. In this way, the service board can implement TFTP distributed processing for the accessed CM 103 in a case in which an IP address is not deployed. Correspondingly, the TFTP distributed processing changes from single centralized processing of the main control board into distributed processing of multiple service boards, thereby greatly improving efficiency of the TFTP distributed processing of the CMTS device, reducing performance pressure of the main control board of the CMTS device, and improving performance of the main control board of the CMTS device.

This embodiment provides the DOCSIS system, including a convergence device, a CMTS assembly, and a CM, where the convergence device is connected to the CM using the CMTS assembly, and the CMTS assembly can implement TFTP distributed processing without deploying an IP address, thereby reducing working pressure of the convergence device, and further improving performance of the convergence device.

Figure 2:
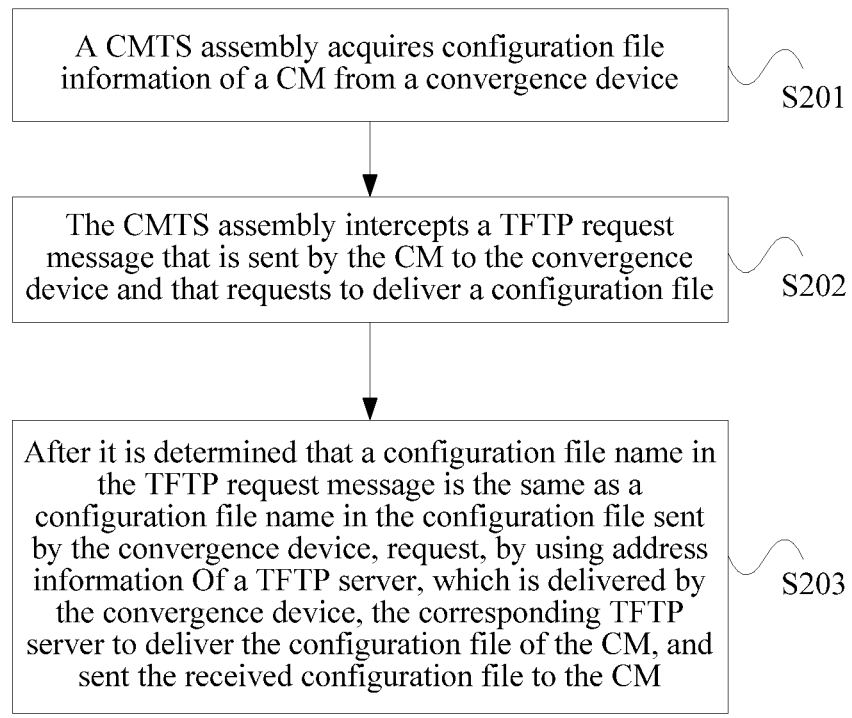
FIG. 2 is a flowchart of a method for acquiring a configuration file in a data over cable service according to an embodiment of the present disclosure.
Figure 3:
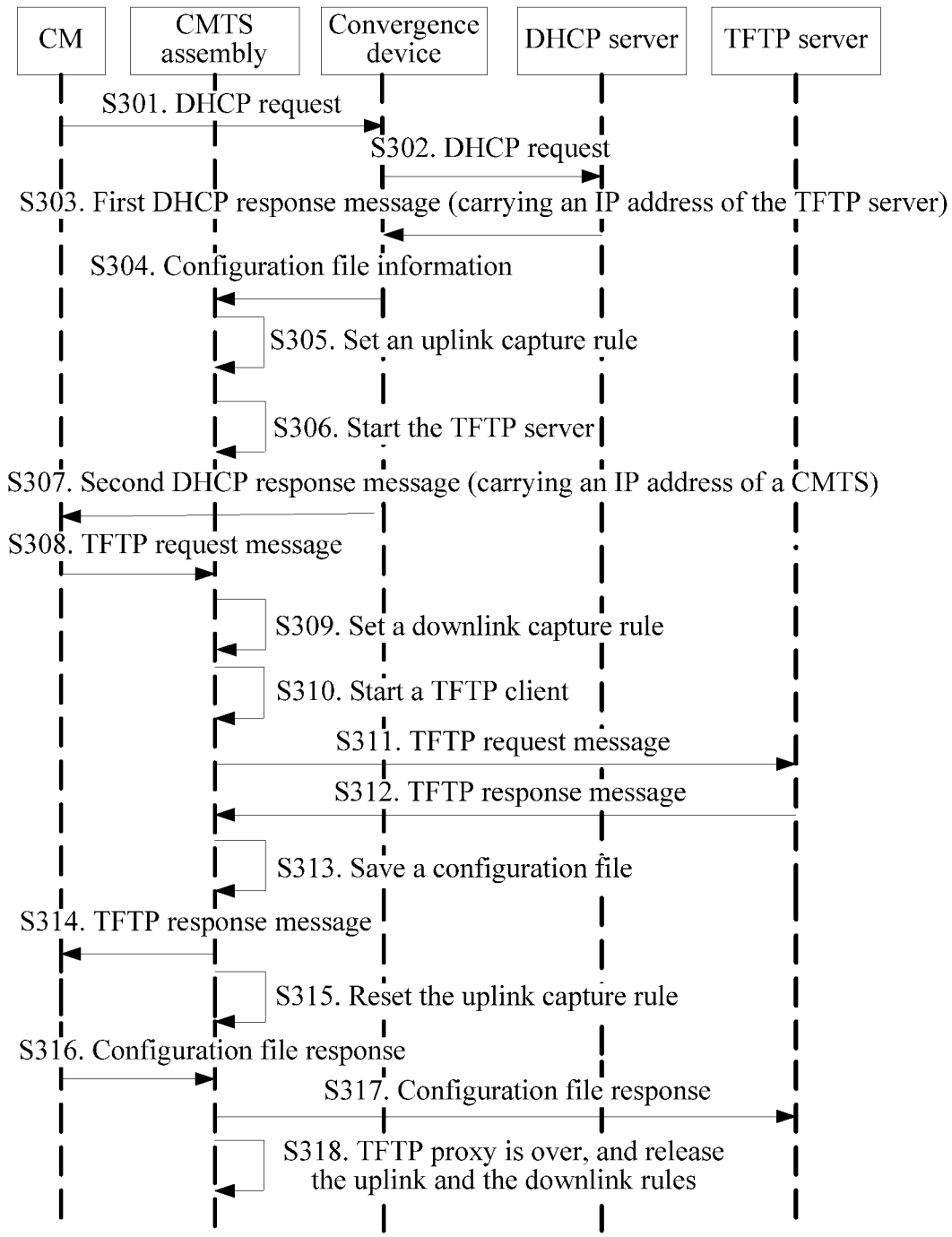
FIG. 3 is a flowchart of interaction among devices such as a convergence device, a CMTS assembly, and a CM in a method for acquiring a configuration file according to an embodiment of the present disclosure.

FIG. 2 is a flowchart of a method for acquiring a configuration file in a data over cable service according to an embodiment of the present disclosure. FIG. 3 is a flowchart of interaction among devices such as a convergence device, a CMTS assembly, and a CM in a method for acquiring a configuration file according to an embodiment of the present disclosure. A system includes a convergence device, a CMTS assembly, and a CM. The method is performed by the CMTS assembly, where the CMTS assembly is a CMC or is a service board in the CMTS device, and the convergence device is an OLT or a main control board in the CMTS device.

As shown in FIG. 2, specific steps of the method include the following steps:

S201: A CMTS assembly acquires configuration file information of a CM from a convergence device.

When a user uses a terminal device connected to a CM in a network, the terminal device triggers the CM to dial up to get online, and the CM requests an IP address from a DHCP server. The convergence device may be used as a relay node of the DHCP server. The convergence device intercepts a first DHCP response message sent by the DHCP server to the CM, and the convergence device acquires configuration file information of the CM from the first DHCP response message, where the configuration file information carries an IP address and a port number of a TFTP server and an IP address and a MAC address of the CM, a configuration file name, and the like. The port number of the TFTP server is 69. The CMTS assembly acquires the configuration file information of the CM from the convergence device, and buffers the configuration file information in a buffer.

S202: The CMTS assembly intercepts a TFTP request message that is sent by the CM to the convergence device and that requests to deliver a configuration file.

The CMTS assembly sets an uplink capture rule according to the configuration file information, where the uplink capture rule is that the CMTS assembly captures a packet whose destination address is an IP address of the convergence device and whose destination port number is the port number 69 of the TFTP server, so as to capture the TFTP request message that is sent by the CM and that requests to deliver the configuration file. The TFTP request message is a UDP packet. The CMTS assembly starts the TFTP server.

S203: After it is determined that a configuration file name in the TFTP request message is the same as a configuration file name in the configuration file sent by the convergence device, request, using address information of a TFTP server, which is delivered by the convergence device, the corresponding TFTP server to deliver the configuration file of the CM, and send the received configuration file to the CM.

The CMTS assembly determines whether the configuration file name in the TFTP request message is the same as the configuration file name in the configuration file sent by the convergence device, to determine whether to request the TFTP server to deliver the configuration file of the CM. If a detecting result is that the configuration file name in the TFTP request message is different from the configuration file name in the configuration file sent by the convergence device, the CMTS assembly does not request the TFTP server to deliver the configuration file of the CM anymore; or if a detecting result is that the configuration file name in the TFTP request message is the same as the configuration file name in the configuration file sent by the convergence device, the CMTS assembly requests the TFTP server to deliver the configuration file of the CM.

Optionally, the CMTS assembly requests, using address information of the CM as a source address, the TFTP server to deliver the configuration file of the CM.

The CMTS assembly sends a TFTP response message carrying the configuration file to the CM, where the sent TFTP response message uses address information of the convergence device as a source address.

After capturing the TFTP request message sent by the CM, the CMTS assembly requests, using the IP address and a port number of the CM as the source address, a network side to deliver the configuration file of the CM. In addition, the CMTS assembly sets a downlink capture rule according to the determined IP address and port number of the CM, where the downlink capture rule is capturing a data packet whose destination address is the IP address of the CM and whose destination port number is the port number of the CM. Therefore, the CMTS assembly can capture the TFTP response message. The CMTS assembly sends the received configuration file to the CM in a form of the TFTP response message, where the sent TFTP response message uses the IP address of the convergence device and a port number of the CMTS assembly as the source address.

The following gives a process of interaction among devices such as a convergence device, a CMTS assembly, and a CM in a method for acquiring a configuration file, which, as shown in FIG. 3, includes the following steps:

S301: A CM sends a DHCP request to a convergence device, used to request an IP address of the CM and an IP address of a TFTP server.

The CM needs to apply for an IP address from a DHCP server, to get online, and the CM needs to acquire a configuration file from the TFTP server. Therefore, the CM needs to simultaneously request the IP address of the TFTP server from the DHCP server.

S302: The convergence device sends the DHCP request to a DHCP server, where the convergence device is used as a relay of the CM and the DHCP server, and the convergence device performs a DHCP Relay operation.

S303: The convergence device intercepts a first DHCP response message sent by the DHCP server to the CM, where the first DHCP response message carries configuration file information of the CM.

The convergence device may further change the IP address of the TFTP server carried in the first DHCP response message to an IP address of the convergence device, to form a second DHCP response message, so that CM sends a request for acquiring the configuration file to the convergence device. The convergence device changes the IP address of the TFTP server to the IP address of convergence device. Therefore, the convergence device hides the IP address of the TFTP server from the final CM, so that a hacker is prevented from learning the IP address of the TFTP server, thereby preventing the hacker from attacking the TFTP server.

S304: The convergence device sends the configuration file information to a CMTS assembly.

The CMTS assembly buffers the configuration file information in a buffer, and the configuration file information includes the IP address of the convergence device, the IP address and a port number of the TFTP server, an IP address and a MAC address of the CM, a configuration file name, and the like.

S305: The CMTS assembly sets an uplink capture rule.

The CMTS assembly sets the uplink capture rule according to the configuration file information, which includes capturing a packet whose destination address is the IP address of the convergence device and whose destination port number is a port number 69 of the TFTP server.

S306: The CMTS assembly starts the TFTP server.

The CMTS assembly starts the TFTP server. In this way, a TFTP server port does not need to be opened on a management plane, and a system is securer.

S307: The convergence device sends a second DHCP response message to the CM, where the second DHCP response message carries an IP address of a CMTS.

S308: The CM sends a TFTP request message to the CMTS assembly.

The CMTS assembly sets the uplink capture rule, where the uplink capture rule refers to a capture rule from a user side to a network side. Therefore, the CMTS assembly can capture the TFTP request message that is sent by the CM and that requests to deliver a configuration file.

S309: The CMTS assembly sets a downlink capture rule.

The CMTS assembly sets the downlink capture rule according to the IP address and the port number of the CM. The downlink capture rule refers to a capture rule from the network side to the user side. The downlink capture rule is capturing a data packet whose destination address is the IP address of the CM and whose destination port number is the port number of the CM.

S310: The CMTS assembly starts a TFTP client.

S311: The CMTS assembly sends a TFTP request message to the TFTP server.

The TFTP request message sent by the CM includes a configuration file name, and the first DHCP response message sent by the convergence device includes a configuration file name allocated to the CM. The CMTS assembly determines whether the configuration file name in the TFTP request message is the same as the configuration file name in the configuration file sent by the convergence device, to determine whether to request the TFTP server to deliver a configuration file of the CM. If a detecting result is that the configuration file name in the TFTP request message is different from the configuration file name in the configuration file sent by the convergence device, the CMTS assembly does not request the TFTP server to deliver the configuration file of the CM anymore; or if a detecting result is that the configuration file name in the TFTP request message is the same as the configuration file name in the configuration file sent by the convergence device, the CMTS assembly requests the TFTP server to deliver the configuration file of the CM.

S312: The TFTP server sends a TFTP response message to the CMTS assembly.

Because of the IP address and the port number of the CM that are used by the CMTS assembly, after receiving the TFTP request message, the TFTP server sends the TFTP response message to the CMTS assembly. To support simultaneous downloading of the configuration file by multiple terminals, the TFTP server allocates multiple port numbers x to send the TFTP response message. The objective is that multiple terminals can apply for the configuration file from the TFTP server.

S313: The CMTS assembly saves a configuration file carried in the TFTP response message in a buffer.

S314: The CMTS assembly sends the TFTP response message to the CM.

The CMTS assembly sends the TFTP response message to the CM using the IP address of the convergence device and a port number automatically generated by the CMTS assembly as a source address.

S315: The CMTS assembly resets the uplink capture rule.

The reset uplink capture rule is capturing all data packets whose destination addresses are the IP address of the convergence device and port numbers automatically generated by the CMTS assembly.

S316: The CM sends a configuration file response to the CMTS assembly.

The reset uplink capture rule is capturing all the data packets whose destination addresses are the IP address of the convergence device and port numbers automatically generated by the CMTS assembly. Therefore, the CMTS assembly intercepts the configuration file response sent by the CM to the TFTP server. In addition, the CMTS assembly compares whether the configuration file is tampered.

S317: The CMTS assembly sends the configuration file response to the TFTP server, where a destination address is an IP address of the TFTP server and a port number is x.

S318: TFTP proxy is over, and release the uplink and the downlink rules.

This embodiment provides the method for acquiring a configuration file in a DOCSIS system. In the method, a CMTS assembly mainly intercepts a TFTP request message that is sent by a CM to a convergence device and that requests to deliver a configuration file, and intercepts a TFTP response message sent by the CM to a TFTP server, so as to implement TFTP distributed processing, thereby reducing working pressure of the convergence device and further improving performance of the convergence device.

Figure 4:
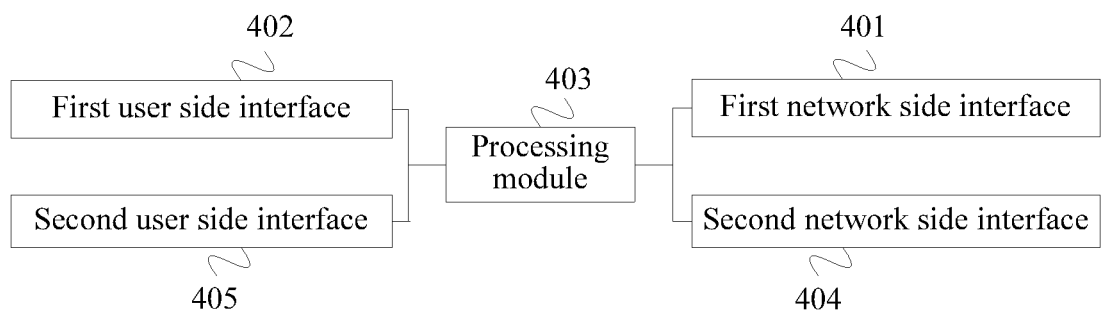
FIG. 4 is a schematic structural diagram of a CMTS assembly according to an embodiment of the present disclosure.

FIG. 4 is a schematic structural diagram of a CMTS assembly according to an embodiment of the present disclosure. Based on Embodiment 1 and Embodiment 2, the CMTS assembly includes a first network side interface 401, a first user side interface 402, a processing module 403, a second network side interface 404, and a second user side interface 405. The first network side interface 401 is configured to acquire configuration file information of a CM from a convergence device, where the configuration file information includes an IP address of the convergence device, an IP address and a port number of a TFTP server, an IP address and a MAC address of the CM, a configuration file name, and the like. The first user side interface 402 is configured to intercept a TFTP request message that is sent by the CM to the convergence device and that requests to deliver a configuration file. The processing module 403 is configured to determine whether a configuration file name in the TFTP request message is the same as a configuration file name in the configuration file sent by the convergence device. The second network side interface 404 is configured to, after the processing module 403 determines that the configuration file name in the TFTP request message is the same as the configuration file name in the configuration file sent by the convergence device, request, using address information of the TFTP server, which is delivered by the convergence device, the corresponding TFTP server to deliver the configuration file of the CM. The second user side interface 405 is configured to send the received configuration file to the CM. The CMTS assembly is a CMC or a service board in a CMTS device.

The CMTS assembly in this embodiment may be configured to perform the technical implementation solution of the method for acquiring a configuration file, and their implementation principles and technical effects are similar, and details are not described herein again.

Figure 5:
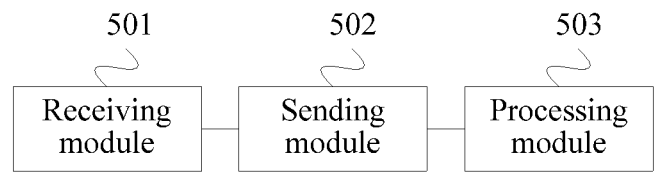
FIG. 5 is a schematic structural diagram of a convergence device according to an embodiment of the present disclosure.

FIG. 5 is a schematic structural diagram of a convergence device according to an embodiment of the present disclosure. Based on Embodiment 1 and Embodiment 2, the convergence device is connected to a CMTS assembly, and is connected to a CM using the CMTS assembly, and the convergence device includes a receiving module 501 configured to receive a first DHCP response message sent by a DHCP server to the CM, and acquire configuration file information of the CM from the first DHCP response message; a sending module 502 configured to send the configuration file information of the CM to the CMTS assembly, so that the CMTS assembly intercepts a TFTP request message from the CM; and a processing module 503 configured to replace address information of a TFTP server in the first DHCP response message with address information of the convergence device, to form a second DHCP response message, and send the second DHCP response message to the CM using the sending module 502. The convergence device is an OLT or a main control board in a CMTS device.

The convergence device in this embodiment may be configured to perform method steps performed by convergence device in FIG. 3, and their implementation principles and technical effects are similar, and details are not described herein again.

Figure 6:
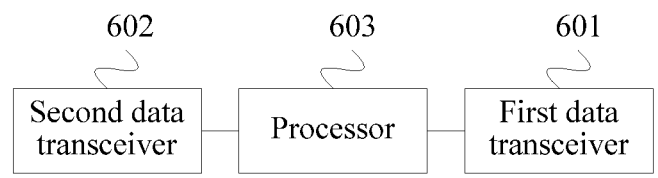
FIG. 6 is a schematic structural diagram of a CMTS assembly according to another embodiment of the present disclosure.

FIG. 6 is a schematic structural diagram of a CMTS assembly according to another embodiment of the present disclosure. Based on Embodiment 1 and Embodiment 2, the CMTS assembly is connected to a convergence device on a network side and is connected to a CM on a user side, and the CMTS assembly includes a first data transceiver 601, a second data transceiver 602, and a processor 603. The processor 603 is separately connected to the first data transceiver 601 and the second data transceiver 602. The first data transceiver 601 is connected to the convergence device, and is configured to acquire configuration file information of the CM from the convergence device. The second data transceiver 602 is configured to intercept a TFTP request message that is sent by the CM to the convergence device and that requests to deliver a configuration file. The processor 603 is configured to determine whether a configuration file name in the TFTP request message is the same as a configuration file name in the configuration file sent by the convergence device; after it is determined that the configuration file name in the TFTP request message is the same as the configuration file name in the configuration file sent by the convergence device, control the first data transceiver 601 to request, using address information of a TFTP server, which is delivered by the convergence device, the corresponding TFTP server to deliver the configuration file of the CM; and control the second data transceiver 602 to send the received configuration file to the CM. The CMTS assembly is a CMC or a service board in a CMTS device.

The CMTS assembly in this embodiment may be configured to perform the technical implementation solution of the method for acquiring a configuration file, and their implementation principles and technical effects are similar, and details are not described herein again.

Figure 7:
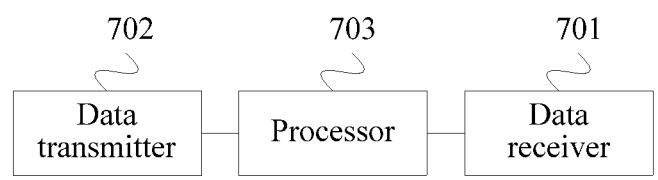
FIG. 7 is a schematic structural diagram of a convergence device according to another embodiment of the present disclosure.

FIG. 7 is a schematic structural diagram of a convergence device according to another embodiment of the present disclosure. The convergence device is connected to a CM using a CMTS assembly, and the convergence device includes a data receiver 701 configured to receive a first DHCP response message sent by a DHCP server to the CM, and acquire configuration file information of the CM from the first DHCP response message; a data transmitter 702 configured to send configuration file information of the CM to the CMTS assembly; and a processor 703 configured to replace address information of a TFTP server in the first DHCP response message with address information of the convergence device, to form a second DHCP response message, and send the second DHCP response message to the CM using the data transmitter. The convergence device is an OLT or a main control board in a CMTS device.

The convergence device in this embodiment may be configured to perform method steps performed by convergence device in FIG. 3, and their implementation principles and technical effects are similar, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data over cable service system, comprising:
a convergence device;
a cable modem terminal system (CMTS) assembly coupled to the convergence device; and
a cable modem (CM) coupled to the convergence device using the CMTS assembly,
wherein the convergence device is configured to:
intercept a first Dynamic Host Configuration Protocol (DHCP) response message from a DHCP server to the CM;
acquire configuration file information of the CM from the first DHCP response message;
send the configuration file information of the CM to the CMTS assembly;
replace address information of a Trivial File Transfer Protocol (TFTP) server in the first DHCP response message with address information of the convergence device to generate a second DHCP response message; and
send the second DHCP response message to the CM,
wherein the CM is configured to send, to the convergence device, a TFTP request message for requesting to deliver a configuration file of the CM, and
wherein the CMTS assembly is configured to:
intercept the TFTP request message when a configuration file name in the TFTP request message is the same as a configuration file name in the configuration file information sent from the convergence device to the CMTS assembly, wherein the convergence device does not receive the TFTP request message when the CMTS assembly intercepts the TFTP request message from the CM;
request, using address information of the CM as a source address, the TFTP server corresponding to the address information of the TFTP server to deliver the configuration file of the CM;
receive, responsive to the request that includes the address information of the CM as the source address, the configuration file of the CM; and
send the configuration file to the CM such that the CM receives the configuration file from the CMTS assembly rather than from the convergence device.

2. The system of claim 1, wherein the CMTS assembly is further configured to send the configuration file to the CM in a form of a TFTP response message, and wherein the sent TFTP response message uses the address information of the convergence device as a source address.

3. The system of claim 1, wherein the convergence device is an optical line terminal (OLT) and the CMTS assembly is a coaxial media converter (CMC).

4. The system of claim 1, wherein the convergence device is a main control board in a CMTS device and the CMTS assembly is a service board in the CMTS device.

5. A method for acquiring a configuration file in a data over cable service, the method comprising:
acquiring, by a cable modem terminal system (CMTS) assembly from a convergence device, configuration file information of a configuration file of a cable modem (CM), wherein the configuration file information including first address information of a Trivial File Transfer Protocol (TFTP) server;
intercepting, by the CMTS assembly, a TFTP request message from the CM to the convergence device when a configuration file name in the TFTP request message is the same as a configuration file name in the configuration file information from the convergence device, wherein the convergence device does not receive the TFTP request message when the CMTS assembly intercepts the TFTP request message from the CM;
requesting, by the CMTS assembly using the first address information included in the configuration file information from the convergence device and using second address information of the CM as a source address, the TFTP server to deliver the configuration file of the CM;
receiving, by the CMTS assembly and responsive to the request that includes the address information of the CM as the source address, the configuration file of the CM from the TFTP server; and
sending, by the CMTS assembly rather than the convergence device, the configuration file to the CM.

6. The method of claim 5, wherein sending, by the CMTS assembly, the delivered configuration file to the CM comprises sending, by the CMTS assembly, a TFTP response message carrying the configuration file to the CM, wherein the TFTP response message uses address information of the convergence device as a source address.

7. A cable modem terminal system (CMTS) assembly, comprising:
a first network side interface configured to acquire, from a convergence device, configuration file information of a configuration file of a cable modem (CM), wherein the configuration file information includes first address information of a Trivial File Transfer Protocol (TFTP) server;
a first user side interface configured to intercept a TFTP request message from the CM to the convergence device, wherein the TFTP request message requests the convergence device to deliver the configuration file to the CM;
a processor coupled to the first network side interface and the first user side interface and configured to determine whether a configuration file name in the TFTP request message is the same as a configuration file name in the configuration file information from the convergence device;
a second network side interface coupled to the processor and configured to request, using the first address information included in the configuration file information from the convergence device and using second address information of the CM as a source address, the TFTP server to deliver the configuration file of the CM when the configuration file name in the TFTP request message is the same as the configuration file name in the configuration file information from the convergence device, wherein the second network side interface is configured to receive, responsive to the request that includes the address information of the CM as the source address, the configuration file of the CM; and
a second user side interface coupled to the processor and configured to send the configuration file to the CM such that the CM receives the configuration file from the CMTS assembly rather than from the convergence device.

8. The CMTS assembly of claim 7, wherein the CMTS assembly is a coaxial media converter (CMC) or a service board in a CMTS device.

9. A system, comprising:
a coaxial media converter (CMC); and
an optical line terminal (OLT) coupled to the CMC and comprising:

a receiver configured to:
  receive a first Dynamic Host Configuration Protocol (DHCP) response message from a DHCP server, the first DHCP response message including address information of a Trivial File Transfer Protocol (TFTP) server; and
  acquire configuration file information of a configuration file of a cable modem (CM) from the first DHCP response message;
a transmitter configured to send the configuration file information to the CMC; and
a processor coupled to the receiver and the transmitter and configured to:
  replace the address information of the TFTP server in the first DHCP response message with address information of the OLT to generate a second DHCP response message; and
  send the second DHCP response message to the CM using the transmitter,
wherein the CMC is configured to:
  intercept a TFTP request message from the CM to the OLT when a configuration file name in the TFTP request message is the same as a configuration file name in the configuration file information sent by the convergence device, wherein the OLT does not receive the TFTP request message when the CMC intercepts the TFTP request message from the CM;
  request, using address information of the CM as a source address, the TFTP server corresponding to the address information of the TFTP server to deliver the configuration file of the CM;
  receive, responsive to the request that includes the address information of the CM as the source address, the configuration file of the CM; and
  send the configuration file to the CM.

10. A cable modem terminal system (CMTS) assembly, comprising:
a first data transceiver;
a second data transceivers; and
a processor separately coupled to the first data transceiver and the second data transceiver,
wherein the first data transceiver is coupled to a convergence device and configured to acquire configuration file information of a cable modem (CM) from the convergence device, wherein the configuration file information includes first address information of a Trivial File Transfer Protocol (TFTP) server,
wherein the second data transceiver is configured to intercept a TFTP request message from the CM that requests the convergence device to deliver a configuration file of the CM, and
wherein the processor is configured to:
  determine whether a configuration file name in the TFTP request message is the same as a configuration file name in the configuration file information from the convergence device;
  control the first data transceiver to request, using the first address information included in the configuration file information from the convergence device and using second address information of the CM as a source address, the TFTP server to deliver the configuration file of the CM when the configuration file name in the TFTP request message is the same as the configuration file name in the configuration file sent by the convergence device;
  receive, responsive to the request that includes the address information of the CM as the source address, the configuration file of the CM; and
  control the second data transceiver to send the delivered-configuration file to the CM such that the CM receives the configuration file from the CMTS assembly rather than from the convergence device.

11. The CMTS assembly of claim 10, wherein the CMTS assembly is a coaxial media converter (CMC) or a service board in a CMTS device.

12. A cable modem terminal system (CMTS), comprising:
a CMTS assembly; and
a convergence device coupled to the CMTS assembly and configured to:
  receive a first Dynamic Host Configuration Protocol (DHCP) response message from a DHCP server;
  acquire configuration file information of a configuration file of a cable modem (CM) from the first DHCP response message, wherein the configuration file information includes first address information of a Trivial File Transfer Protocol (TFTP) server;
  send the configuration file information of the CM to the CMTS assembly;
  replace the first address information of the TFTP server in the first DHCP response message with address information of the convergence device to generate a second DHCP response message; and
  send the second DHCP response message to the CM,
wherein the CMTS assembly is configured to:
  acquire, from the convergence device, the configuration file information of the configuration file of the CM;
  intercept a TFTP request message from the CM to the convergence device, wherein the convergence device does not receive the TFTP request message when the CMTS assembly intercepts the TFTP request message from the CM;
  determine whether a configuration file name in the TFTP request message is the same as a configuration file name in the configuration file information from the convergence device;
  request, using the first address information included in the configuration file information from the convergence device and using second address information of the CM as a source address, a corresponding TFTP server to deliver the configuration file of the CM when the configuration file name in the TFTP request message is the same as the configuration file name in the configuration file information from the convergence device;
  receive, responsive to the request that includes the address information of the CM as the source address, the configuration file of the CM; and
  send the configuration file to the CM.

13. The CMTS of claim 12, wherein the convergence device is an optical line terminal (OLT) or a main control board.

* * * * *

UNITED STATES PATENT AND TRADEMARK OFFICE
CERTIFICATE OF CORRECTION

PATENT NO. : 10,673,692 B2
APPLICATION NO. : 15/239203
DATED : June 2, 2020
INVENTOR(S) : Gen Liu and Chenghu Shen Page 1 of 1

It is certified that error appears in the above-identified patent and that said Letters Patent is hereby corrected as shown below:

In the Claims

Claim 10, Column 16, Line 8 and 9: "send the delivered-configuration file" should read "send the configuration file"

Signed and Sealed this
Twenty-first Day of July, 2020

Andrei Iancu
*Director of the United States Patent and Trademark Office*